US011070939B2

(12) United States Patent
Lemieux

(10) Patent No.: US 11,070,939 B2
(45) Date of Patent: *Jul. 20, 2021

(54) SYSTEM AND METHOD FOR MANAGING EMERGENCY VEHICLE ALERT GEOFENCE

(71) Applicant: WHELEN ENGINEERING COMPANY, INC., Chester, CT (US)

(72) Inventor: Kenneth Lemieux, Groton, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,657

(22) Filed: May 4, 2020

(65) Prior Publication Data

US 2020/0296537 A1 Sep. 17, 2020

Related U.S. Application Data

(63) Continuation of application No. 16/674,153, filed on Nov. 5, 2019, now Pat. No. 10,715,952, which is a
(Continued)

(51) Int. Cl.
*G05D 1/00* (2006.01)
*H04W 4/021* (2018.01)
(Continued)

(52) U.S. Cl.
CPC .......... *H04W 4/021* (2013.01); *G08G 1/0965* (2013.01); *H04W 4/40* (2018.02)

(58) Field of Classification Search
CPC ...... H04W 4/021; H04W 4/40; G08G 1/0965; G05D 1/0276; G05D 1/0088; G05D 2201/0213
See application file for complete search history.

(56) References Cited

U.S. PATENT DOCUMENTS

| 4,704,610 A | 11/1987 | Smith et al. |
| 6,028,514 A | 2/2000 | Lemelson et al. |

(Continued)

FOREIGN PATENT DOCUMENTS

| CA | 2215440 A1 | 3/1999 |
| CN | 104112348 A | 10/2014 |

(Continued)

OTHER PUBLICATIONS

Anzilotti, E., Can the Private Sector Help Cities Stop Traffic Deaths?, www.fastcompany.com, World Changing Ideas Newsletter, Jan. 2, 2018.
(Continued)

*Primary Examiner* — Munear T Akki
(74) *Attorney, Agent, or Firm* — Dilworth IP, LLC

(57) ABSTRACT

A system, method and storage medium for providing an emergency vehicle (EV) alert includes a server receiving a first location of the EV, the server determining a first geofence based on the first location of the EV, the server transmitting the first geofence to a second device, the second device receiving the first geofence, the second device performing at least one alert action in response to determining that the another vehicle is located within the first geofence, the server receiving a second location of the EV at a second time, the server determining a geofence release zone based on the second location of the EV, the server transmitting the geofence release zone to the second device, the second device receiving the geofence release zone, and the second device stopping performing the at least one alert action in response to determining that the another vehicle is within the geofence release zone.

18 Claims, 11 Drawing Sheets

Related U.S. Application Data continuation of application No. 16/298,457, filed on Mar. 11, 2019, now Pat. No. 10,531,224.

(51) Int. Cl.
*G08G 1/0965* (2006.01)
*H04W 4/40* (2018.01)

(56) References Cited

U.S. PATENT DOCUMENTS

| | | | |
|---|---|---|---|
| 6,112,075 A | 8/2000 | Weiser | |
| 6,516,273 B1 | 2/2003 | Pierowicz et al. | |
| 6,700,504 B1 | 3/2004 | Aslandogan et al. | |
| 6,895,332 B2 | 5/2005 | King et al. | |
| 6,958,707 B1 | 10/2005 | Siegel | |
| 7,046,160 B2 | 5/2006 | Pederson et al. | |
| 7,085,637 B2 | 8/2006 | Breed et al. | |
| 7,271,736 B2 | 9/2007 | Siegel et al. | |
| 7,283,045 B1 | 10/2007 | Manz | |
| 7,480,514 B2 | 1/2009 | Karaoguz et al. | |
| 7,522,998 B2 | 4/2009 | Hughes | |
| 7,663,504 B2 | 2/2010 | Votaw et al. | |
| 7,868,783 B2 | 1/2011 | Bachelder | |
| 7,884,738 B2 | 2/2011 | Pappas et al. | |
| 7,899,621 B2 | 3/2011 | Breed et al. | |
| 8,094,040 B1 | 1/2012 | Cornett et al. | |
| 8,346,468 B2 | 1/2013 | Emanuel et al. | |
| 8,350,721 B2 | 1/2013 | Carr | |
| 8,487,780 B2 | 7/2013 | Edwardson | |
| 8,552,885 B2 | 10/2013 | Rijks | |
| 8,581,744 B2 | 11/2013 | Myler | |
| 8,593,301 B2 | 11/2013 | Newman | |
| 8,624,727 B2 | 1/2014 | Saigh et al. | |
| 8,712,429 B2 * | 4/2014 | Nagorniak | H04W 8/22 455/456.1 |
| 8,723,680 B1 | 5/2014 | Baker | |
| 8,823,548 B2 | 9/2014 | Johnson et al. | |
| 8,842,021 B2 | 9/2014 | Behm et al. | |
| 8,928,492 B2 | 1/2015 | Boscacci | |
| 8,935,036 B1 | 1/2015 | Christensen et al. | |
| 8,963,705 B2 | 2/2015 | Miller et al. | |
| 9,053,637 B2 | 6/2015 | Mawbey et al. | |
| 9,254,781 B2 | 2/2016 | Applebaum | |
| 9,278,689 B1 | 3/2016 | Delp | |
| 9,412,273 B2 | 8/2016 | Ricci | |
| 9,547,986 B1 | 1/2017 | Curlander et al. | |
| 9,635,500 B1 | 4/2017 | Becker et al. | |
| 9,738,217 B1 | 8/2017 | Bradley et al. | |
| 9,742,709 B1 | 8/2017 | Laich | |
| 9,756,668 B2 | 9/2017 | Farrell et al. | |
| 9,762,470 B2 | 9/2017 | Alam et al. | |
| 9,786,154 B1 | 10/2017 | Potter et al. | |
| 9,805,430 B2 | 10/2017 | Miasnik et al. | |
| 9,805,601 B1 | 10/2017 | Fields et al. | |
| 9,843,913 B2 | 12/2017 | Dahan et al. | |
| 9,894,478 B1 | 2/2018 | Deluca et al. | |
| 10,127,813 B2 | 11/2018 | Walsh et al. | |
| 10,531,224 B1 | 1/2020 | Lemieux | |
| 10,559,208 B1 | 2/2020 | McAlpine et al. | |
| 10,689,815 B2 | 6/2020 | Sheckler et al. | |
| 2003/0137415 A1 | 7/2003 | Thomson | |
| 2003/0141990 A1 | 7/2003 | Coon | |
| 2003/0169181 A1 | 9/2003 | Taylor | |
| 2004/0246144 A1 | 12/2004 | Siegel et al. | |
| 2004/0263355 A1 | 12/2004 | Carroll | |
| 2005/0104745 A1 | 5/2005 | Bachelder et al. | |
| 2006/0009234 A1 | 1/2006 | Freer | |
| 2006/0030984 A1 | 2/2006 | Kamiya | |
| 2007/0132608 A1 | 6/2007 | Votaw et al. | |
| 2007/0132609 A1 | 6/2007 | Stackelhouse | |
| 2007/0159354 A1 * | 7/2007 | Rosenberg | G08G 1/0965 340/902 |
| 2008/0088434 A1 | 4/2008 | Frieder et al. | |
| 2008/0125970 A1 | 5/2008 | Scheckler | |
| 2009/0299625 A1 | 12/2009 | Denaro | |
| 2011/0018736 A1 | 1/2011 | Carr | |
| 2011/0068949 A1 | 3/2011 | Ieda et al. | |
| 2011/0178811 A1 | 7/2011 | Sheridan | |
| 2011/0187559 A1 | 8/2011 | Applebaum et al. | |
| 2011/0256881 A1 | 10/2011 | Huang et al. | |
| 2012/0259537 A1 * | 10/2012 | Schmidt | H04W 4/021 701/300 |
| 2012/0313792 A1 | 12/2012 | Berm et al. | |
| 2013/0027221 A1 | 1/2013 | Johnson et al. | |
| 2013/0090843 A1 | 4/2013 | Funabashi | |
| 2013/0105583 A1 | 5/2013 | Peterson et al. | |
| 2013/0110292 A1 | 5/2013 | Peterson et al. | |
| 2013/0110357 A1 | 5/2013 | Peterson et al. | |
| 2013/0173474 A1 | 7/2013 | Ranganathan et al. | |
| 2013/0295970 A1 | 11/2013 | Sheshadri et al. | |
| 2013/0326137 A1 | 12/2013 | Bilange et al. | |
| 2014/0121932 A1 | 5/2014 | Zeng | |
| 2014/0210643 A1 | 7/2014 | Baker | |
| 2014/0354449 A1 | 12/2014 | Alam et al. | |
| 2015/0288819 A1 | 10/2015 | Brown et al. | |
| 2016/0042767 A1 | 2/2016 | Araya et al. | |
| 2016/0063773 A1 | 3/2016 | Hatton et al. | |
| 2016/0071412 A1 | 3/2016 | Bullock et al. | |
| 2016/0071417 A1 | 3/2016 | Lewis et al. | |
| 2016/0100302 A1 | 4/2016 | Barash et al. | |
| 2016/0154117 A1 | 6/2016 | Baudia | |
| 2016/0171521 A1 | 6/2016 | Ramirez et al. | |
| 2016/0210858 A1 | 7/2016 | Foster et al. | |
| 2017/0015239 A1 | 1/2017 | Rao et al. | |
| 2017/0098372 A1 | 4/2017 | Eilertsen | |
| 2017/0098373 A1 | 4/2017 | Filley et al. | |
| 2017/0105108 A1 | 4/2017 | South | |
| 2017/0187787 A1 | 6/2017 | Syamala et al. | |
| 2017/0192429 A1 * | 7/2017 | Tseng | G05D 1/0088 |
| 2017/0193821 A1 | 7/2017 | Baranga et al. | |
| 2017/0219360 A1 | 8/2017 | Cui et al. | |
| 2017/0241660 A1 | 8/2017 | Sekar et al. | |
| 2017/0332347 A1 | 11/2017 | Boss et al. | |
| 2017/0353892 A1 | 12/2017 | Elia et al. | |
| 2017/0359712 A1 | 12/2017 | Meredith et al. | |
| 2017/0366930 A1 | 12/2017 | Treman | |
| 2018/0005523 A1 | 1/2018 | Cahan et al. | |
| 2018/0059669 A1 | 3/2018 | Madigan et al. | |
| 2018/0087914 A1 | 3/2018 | Bravo et al. | |
| 2018/0090000 A1 | 3/2018 | Bravo et al. | |
| 2018/0121956 A1 | 5/2018 | Deluca et al. | |
| 2018/0204447 A1 | 7/2018 | Morgan et al. | |
| 2018/0232767 A1 | 8/2018 | Garg et al. | |
| 2018/0322785 A1 | 11/2018 | Jerichow et al. | |
| 2019/0019297 A1 | 1/2019 | Lim et al. | |
| 2019/0027032 A1 | 1/2019 | Arunachalam | |
| 2019/0035269 A1 | 1/2019 | Donovan et al. | |
| 2019/0082377 A1 * | 3/2019 | Silver | H04W 4/027 |
| 2019/0088106 A1 | 3/2019 | Grundstrom | |
| 2019/0088140 A1 | 3/2019 | Sheckler et al. | |
| 2019/0101930 A1 * | 4/2019 | Yadmellat | G05D 1/0276 |
| 2019/0220001 A1 * | 7/2019 | Lavoie | B62D 15/0285 |

FOREIGN PATENT DOCUMENTS

| | | |
|---|---|---|
| CN | 105857277 A | 8/2016 |
| CN | 105894857 A | 8/2016 |
| DE | 102013008545 A1 | 11/2014 |
| DE | 102016005114 A1 | 2/2017 |
| EP | 2325822 A1 | 5/2011 |
| FR | 3046771 A1 | 7/2017 |
| JP | 2009198391 A | 9/2009 |
| JP | 2014201181 A | 10/2014 |
| KR | 1020160092965 A | 8/2016 |
| WO | 2006034246 A2 | 3/2006 |
| WO | 2015136958 A1 | 9/2015 |
| WO | 2017082756 A1 | 5/2017 |
| WO | 2017200754 A1 | 5/2017 |
| WO | 2017200794 A1 | 11/2017 |

OTHER PUBLICATIONS

2018 GovTech 100, Next Wave of Civic Innovation, http://www.

(56) References Cited

OTHER PUBLICATIONS govtech.com/100/, Jan. 22, 2018.
HAAS AlertR2* (Responder-to-Vehicle) Technology: Enabling Safer, Faster, Emergency Response, HAAS Inc., 2018.
PCT International Search Report and Written Opinion of the International Searching Authority dated Oct. 8, 2019 in corresponding Application No. PCT/US2019/021604, 15 pages.
PCT International Search Report and Written Opinion dated Aug. 27, 2018 from corresponding Application No. PCT/US18/37297, 17 pages.

* cited by examiner

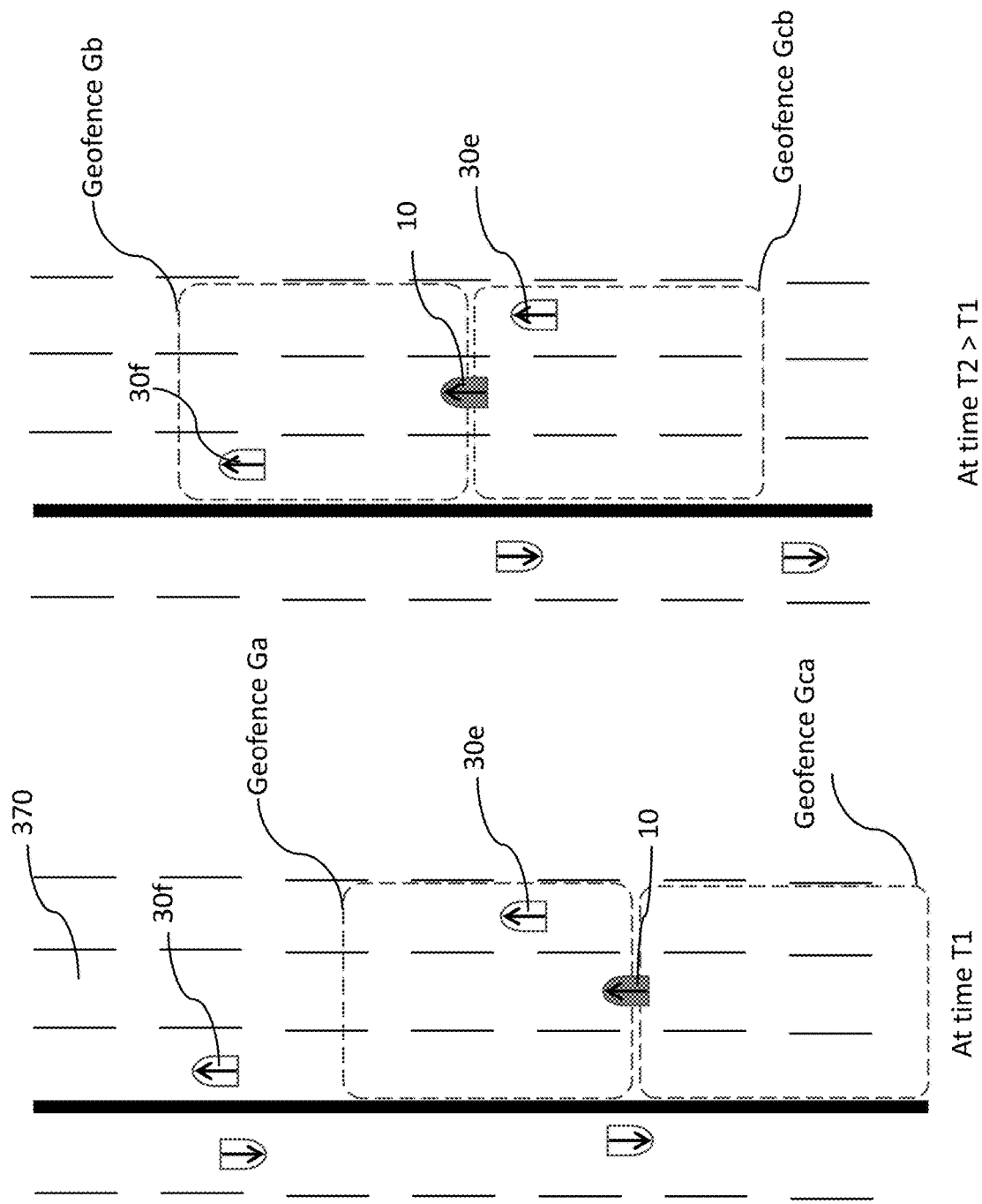
FIG. 3A — At time T1
FIG. 3B — At time T2 > T1

| Vehicle ID 510 | Geofence information 520 | ... |
|---|---|---|

| Vehicle ID 510 | Geofence information 520 | Vehicle type 530 | Alert actions 540 |
|---|---|---|---|

| Geofence | G(x) | Type of Geofences |
|---|---|---|
| Geofence Ga | $G_a(x)$ | Setup |
| Geofence Gca | $G_{ca}(x)$ | Release |
| Geofence Gb | $G_b(x)$ | Setup |
| Geofence Gcb | $G_{cb}(x)$ | Release |

FIG. 5

SYSTEM AND METHOD FOR MANAGING EMERGENCY VEHICLE ALERT GEOFENCE

TECHNICAL FIELD

This application relates to a system or method for effectively managing a geofence for an emergency vehicle.

BACKGROUND

When emergency situations such as occurrences of disasters, car accidents, crimes, etc. take place, it is not only critical to send emergency responders to emergency scenes promptly and efficiently to provide rescue efforts to the people involved in the emergency event, but it is also important to guarantee the safety of emergency vehicles (EVs) heading to the emergency scene.

Widely used means to guarantee the safety of EVs includes providing direct emergency vehicle alerts based on conventional audio or visual signaling devices such as flashing lights, sirens and/or horns. However, these conventional signaling devices may not be adequate, or may provide unnecessary alerts to vehicles which are not even on roads that the EV can travel. These alerts may also easily be ignored by people, or go unnoticed by people with hearing impairments or by distracted drivers.

Regarding these issues, U.S. patent application Ser. No. 15/958,550 discloses a method for generating a safety zone based on node data collected from emergency equipment and giving warning messages to other vehicles when they approach near the zone, the entire disclosure of which are incorporated by reference herein.

However, there has been no prior work on setting up an EV alert geofence and clearing the setup geofence for regions which the EV has passed already or will not travel over.

SUMMARY OF THE INVENTION

Aspects of the present disclosure are a system, method and storage medium for setting up a geofence for an emergency vehicle (EV) to provide an EV alert to other vehicles within the setup geofence and clearing up the setup geofence for regions which the EV has passed already or will not travel over.

In one aspect, there is provided a system for managing a geofence for an emergency vehicle (EV). The system includes a receiver, a processor and a transmitter. The receiver is configured to receive a first location of the EV from a first device at a first time, the first device being associated with the EV. The processor is configured to determine a first geofence based on the first location of the EV. The transmitter is configured to transmit the determined first geofence to a second device associated with another vehicle, the another vehicle being located within the first geofence. The receiver is further configured to receive a second location of the EV from the first device at a second time subsequent to the first time. The processor is further configured to determine a geofence release zone based on the second location of the EV. The transmitter is further configured to transmit the geofence release zone to the second device.

In one embodiment, the second device may be configured to receive the first geofence; determine a location of the another vehicle with respect to the first geofence; and perform one or more alert actions based on the determined location of the another vehicle with respect to the first geofence.

In one embodiment, the second device may further be configured to receive the geofence release zone; determine the location of the another vehicle with respect to the geofence release zone; and stop performing the one or more alert actions based on the determined location of the another vehicle with respect to the geofence release zone.

In one embodiment, the system may further include the second device, wherein the second device may include another receiver configured to receive the first geofence and the geofence release zone and another processor configured to determine a location of the another vehicle with respect to the first geofence; control an alert-generation device to perform the one or more alert actions based on the determined location of the another vehicle with respect to the first geofence; determine a location of the another vehicle with respect to the geofence release zone; and control the alert-generation device to stop performing the one or more alert actions based on the determined location of the another vehicle with respect to the geofence release zone.

In one embodiment, the first geofence may be defined to cover one or more regions excluding all rear regions of the EV.

In one embodiment, the geofence release zone may be defined to cover one or more rear regions located behind the second location of the EV.

In one embodiment, the processor may further be configured to generate a first control signal including the first geofence and a second control signal including the geofence release zone, and the transmitter may further be configured to broadcast the first and second control signals over a wireless channel around the EV.

In one embodiment, a region defined by the first geofence may not overlap the geofence release zone.

In one embodiment, the alert-generation device may include at least one of a speaker and a visual display.

In one embodiment, the processor may further be configured to determine a second geofence defined to cover one or more rear regions of the EV when the EV slows down or stops, the transmitter may further be configured to transmit the determined second geofence to the second device, and the second device may be configured to receive the second geofence; determine a location of the another vehicle with respect to the second geofence; and perform second one or more alert actions based on the determined location of the another vehicle with respect to the second geofence.

In another aspect of the present disclosure, there is provided a method for managing a geofence for an emergency vehicle (EV). The method includes receiving, by a receiver of a management server, a first location of the EV from a first device at a first time; determining, by a processor of the management server, a first geofence based on the first location of the EV; transmitting, by a transmitter of the management server, the determined first geofence to a second device associated with another vehicle, the another vehicle being located within the first geofence; receiving, by the receiver of the management server, a second location of the EV at a second time subsequent to the first time; determining, by the processor of the management server, a geofence release zone based on the second location of the EV; and transmitting, by the transmitter of the management server, the geofence release zone to the second device. The first device is associated with the EV.

In still yet another aspect of the present disclosure, there is provided a computer-readable storage medium having computer readable program instructions. The computer readable program instructions can be read and executed by at least first and second processors for performing a method for managing a geofence for an emergency vehicle (EV). The method includes receiving, by a receiver of a management server, a first location of the EV from a first device at a first time; determining, by a processor of the management server, a first geofence based on the first location of the EV; transmitting, by a transmitter of the management server, the determined first geofence to a second device associated with another vehicle, the another vehicle being located within the first geofence; receiving, by the receiver of the management server, a second location of the EV at a second time subsequent to the first time; determining, by the processor of the management server, a geofence release zone based on the second location of the EV; and transmitting, by the transmitter of the management server, the geofence release zone to the second device. The first device is associated with the EV.

BRIEF DESCRIPTION OF THE DRAWINGS

The present disclosure will become more readily apparent from the specific description accompanied by the drawings.

FIGS. 3A-3B depict an example scenario where geofences are setup and cleared up for an EV, according to an exemplary embodiment of the present disclosure;

FIG. 4A depicts an example safety warning signal generated by a remote management server and transmitted to a subscriber device of each of other vehicles according to an exemplary embodiment of the present disclosure;

FIG. 4B depicts an example safety warning signal generated by a remote management server and transmitted to a subscriber device of each of other vehicles according to an exemplary embodiment of the present disclosure;

FIG. 5 depicts an example mapping table where mapping relationships among a type of geofences, a geofence and a corresponding geofence function are defined, according to an exemplary embodiment of the present disclosure;

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a." "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A. B and C", "at least one of A. B, or C", "one or more of A, B, and C", "one or more of A, B, or C" and "A. B. and/or C" means A alone, B alone, C alone, A and B together. A and C together. B and C together, or A. B and C together.

The term "Geofence" of an emergency vehicle (EV) is defined as a boundary of a safety alert zone where other one or more vehicles in the vicinity of the EV are alerted to the presence of the EV. Thus, it can be appreciated that a zone encompassed by the geofence can be a safety alert zone. Further. "Geofencing" for an EV can be understood as generating the safety alert zone for the EV.

Figure 1:
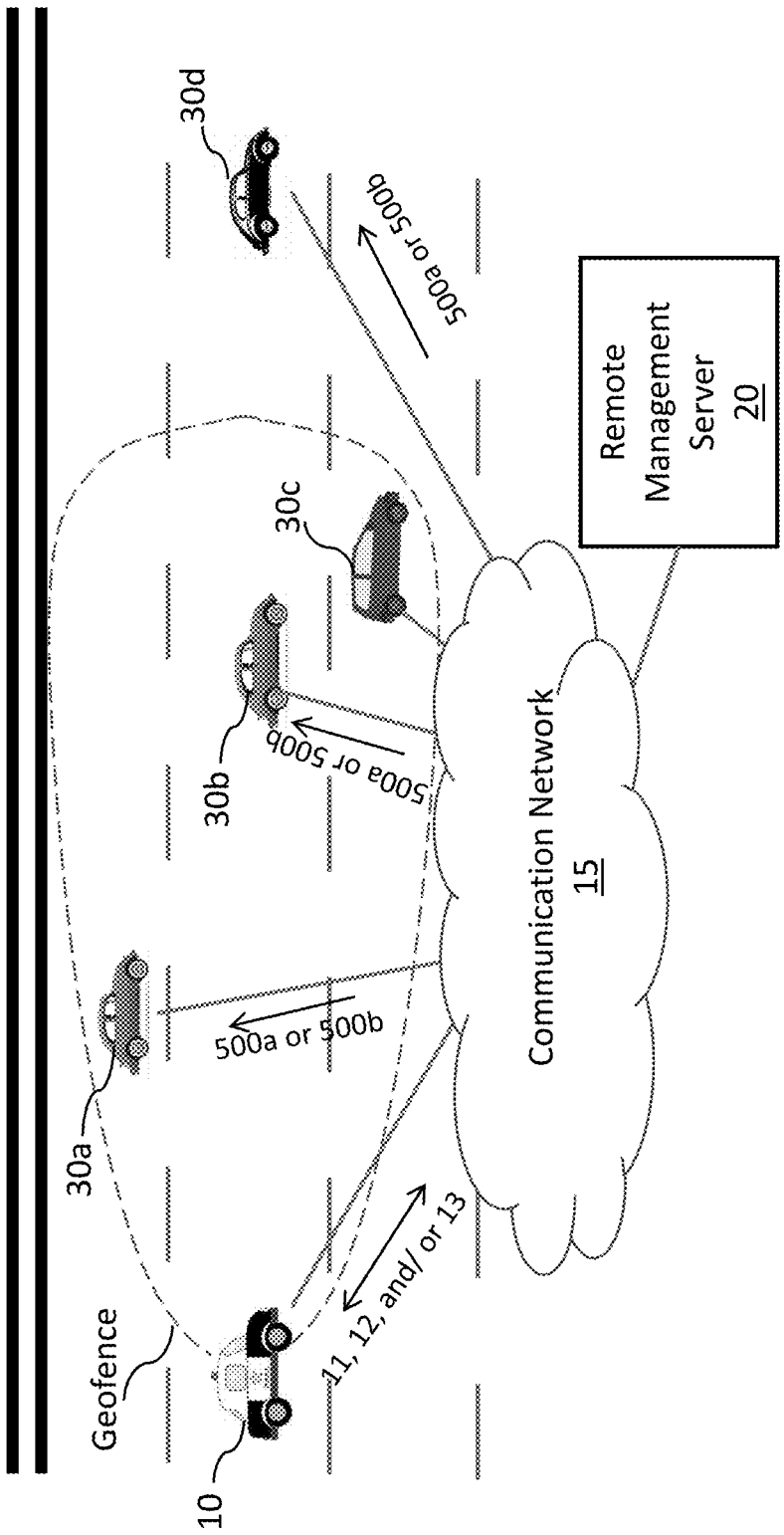
FIG. 1 depicts an example environment where an EV alert management network is operated according to an exemplary embodiment of the present disclosure.

FIG. 1 depicts an example environment where an EV alert management network is operated according to an exemplary embodiment of the present disclosure.

Referring now to FIG. 1, an EV 10 communicates with a remote management server 20 through a communication network 15 for exchanging EV-related data 11, an emergency indication signal 12, an emergency state release signal 13 and/or the like, and the remote management server 20 communicates with each of other vehicles 30a to 30d which travel on roads nearby the EV 10.

Figure 2A:
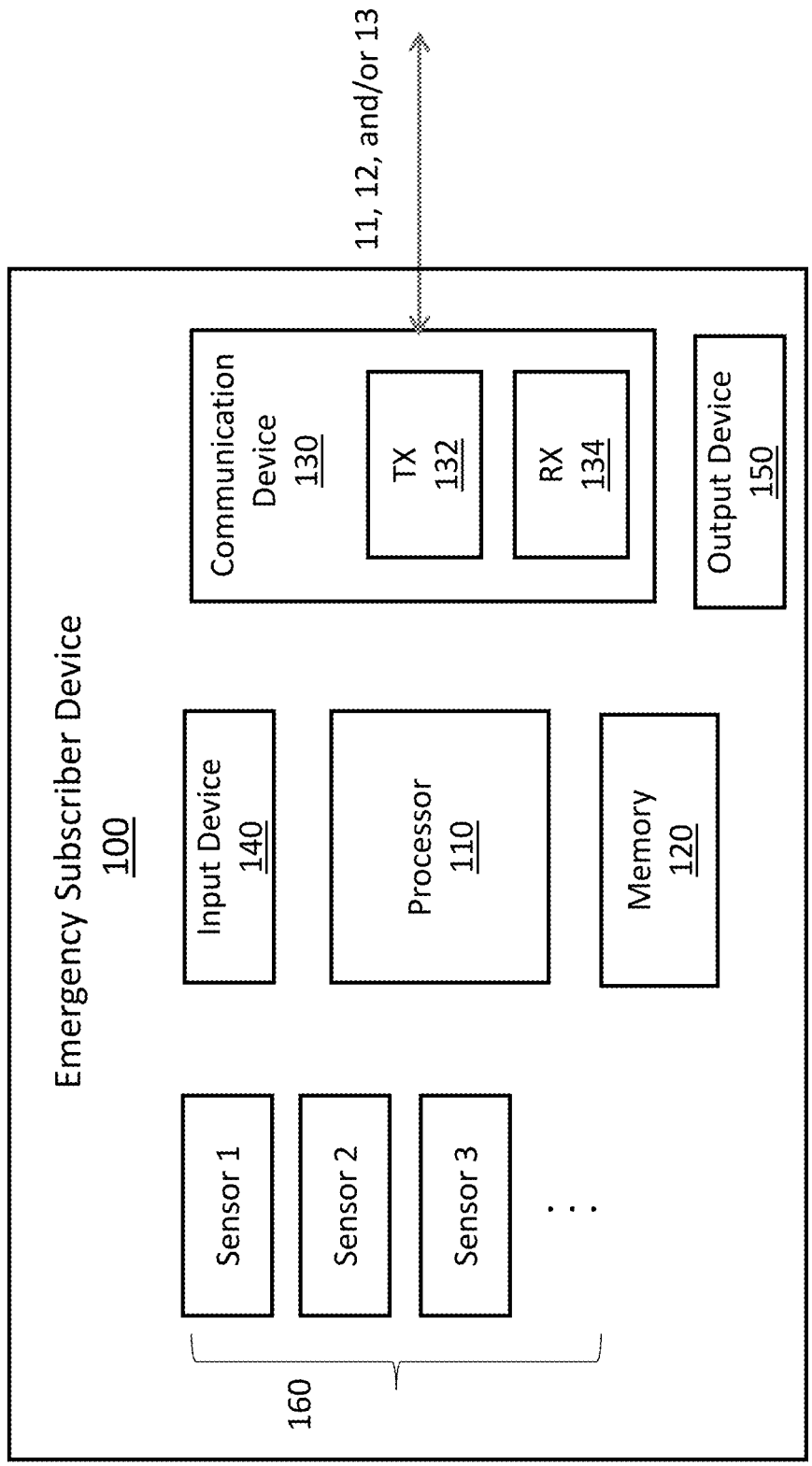
FIG. 2A depicts a block diagram of an emergency subscriber device according to an exemplary embodiment of the present disclosure.
Figure 2B:
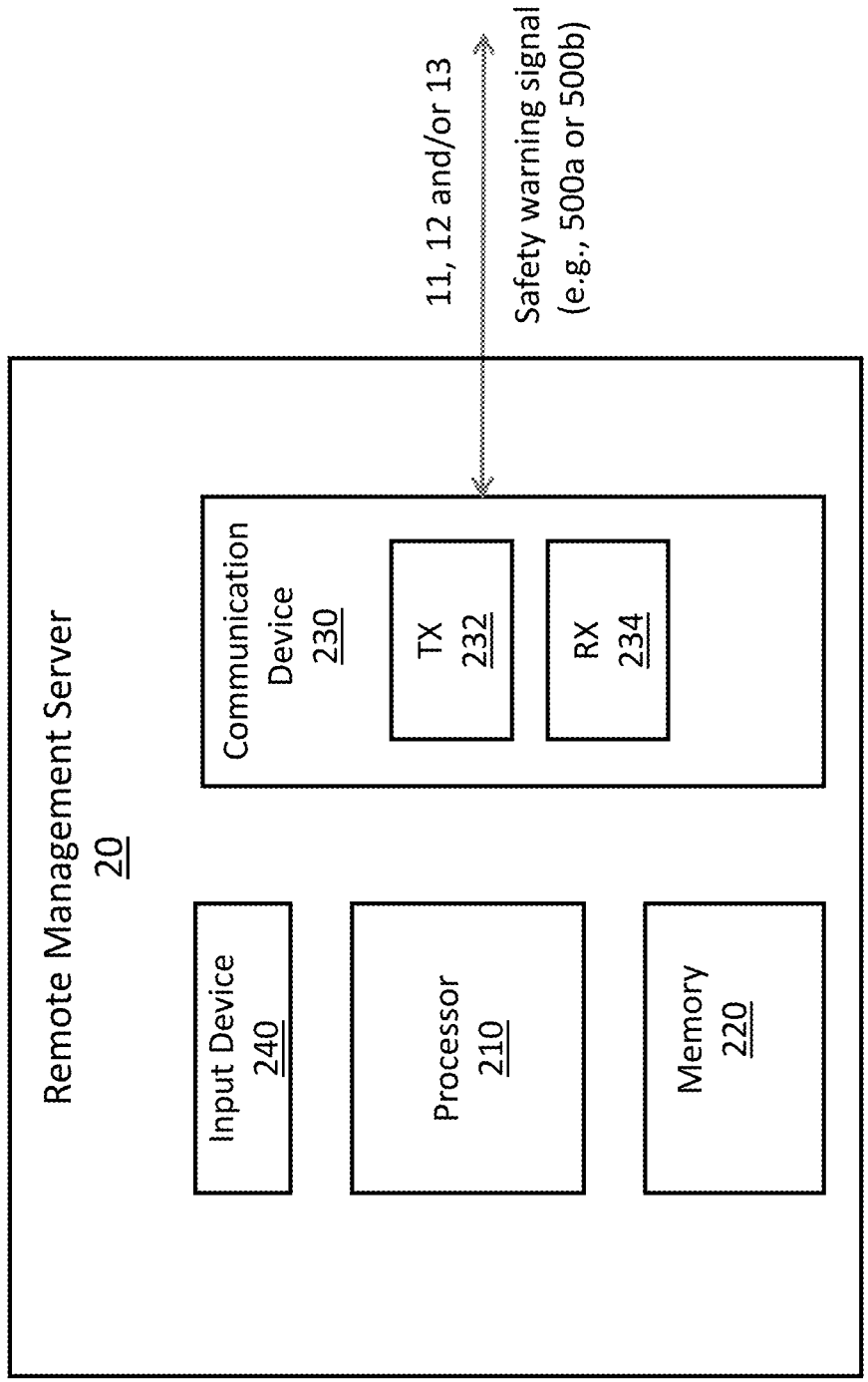
FIG. 2B depicts a block diagram of a remote management server according to an exemplary embodiment of the present disclosure.
Figure 2C:
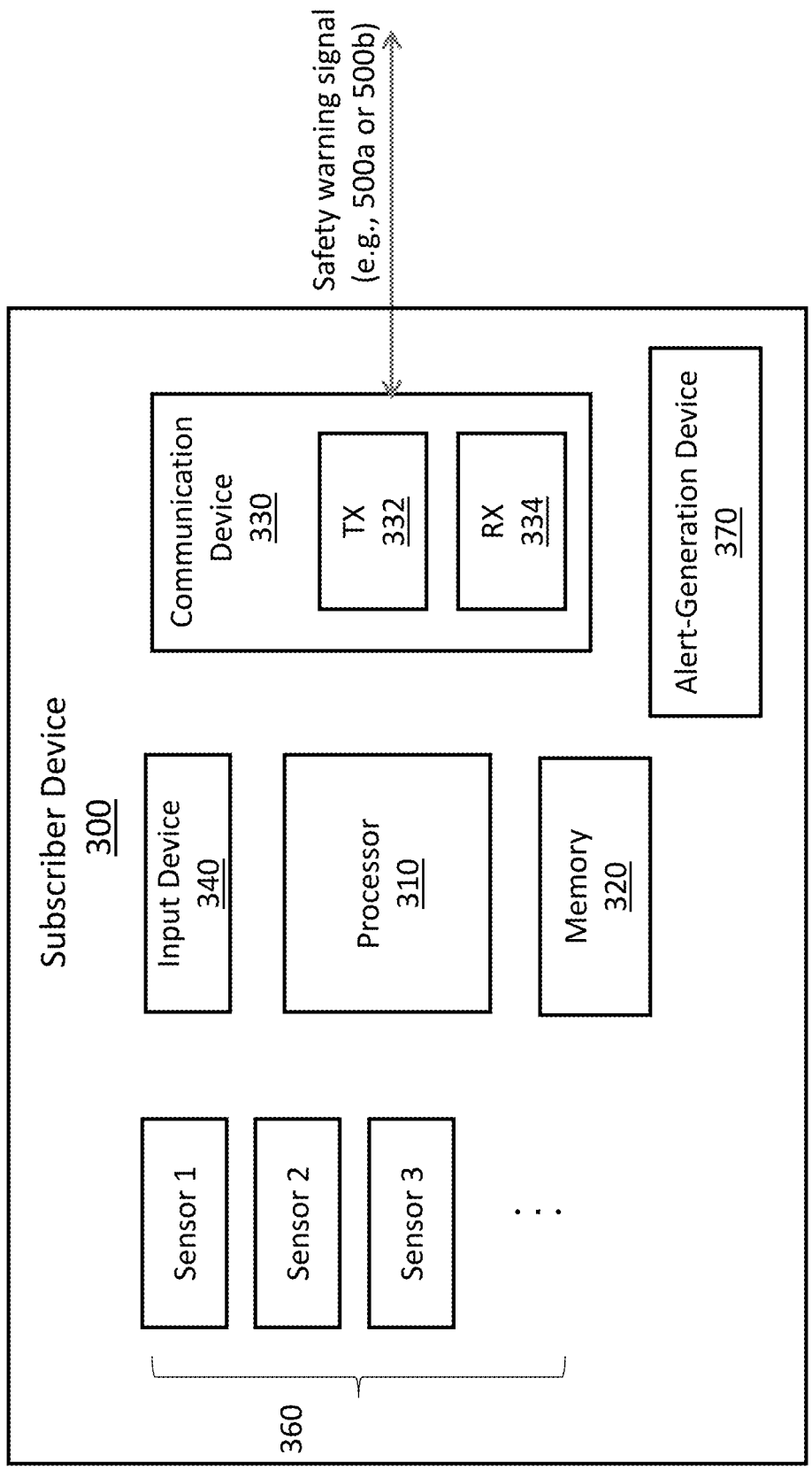
FIG. 2C depicts a block diagram of a subscriber device receiving an EV alert from the remote management server according to an exemplary embodiment of the present disclosure.

FIG. 2A depicts a block diagram of an emergency subscriber device 100 according to an exemplary embodiment of the present disclosure. FIG. 2B depicts a block diagram of a remote management server 20 according to an exemplary embodiment of the present disclosure. FIG. 2C depicts a block diagram of a subscriber device 300 receiving an EV alert from the remote management server 20 according to an exemplary embodiment of the present disclosure.

In one embodiment, the emergency subscriber device 100 can be associated with the EV 10. For example, the emergency subscriber device 100 can be installed as a part of the EV 10, or a wearable or portable (hand held) device attached to the EV 10. Similarly, in one embodiment, the subscriber device 300 can be associated with each vehicle 30a to 30d. For example, the subscriber device 300 can be installed as a part of each vehicle 30a to 30d, or a wearable or portable (hand held) device attached to the vehicle.

Referring particularly to FIG. 2A, the emergency subscriber device 100 includes a processor 110, a memory 120, an input device 140, an output device 150, a communication device 130 and one or more sensor devices 160.

When the EV 10 is in an emergency state where it heads to an emergency scene, the emergency subscriber device 100 triggers an emergency state and transmits an emergency indication signal 12 to the remote management server 20 using the transmitter 132. The emergency indication signal 12 indicates that the EV is in an emergency state, and upon receiving the emergency indication signal 12, the remote management server 20 can perform one or more safety actions to provide an alert of the EV 10 to other vehicles 30a to 30d traveling on roads nearby the EV 10. The safety actions may include: determining a geofence, generating a safety warning signal (e.g., 500a of FIG. 3A or 500b of FIG. 3B) based on the determined geofence; and transmitting the safety warning signal to the other vehicles 30a to 30d nearby the EV 10, more details of which will be described later. The emergency indication signal 12 may include an ID of the EV, and optionally, various EV-related data such as a type of the EV, a location of the EV, a moving direction of the EV, a velocity of the EV, or the like.

By way of example, the emergency state can automatically be triggered when flashing lights, sirens and/or horns of the EV 10 are activated. However, exemplary embodiments of the present disclosure are not limited thereto.

In some examples, the EV-related data 11 can be incorporated into the emergency indication signal 12, or can separately be transmitted from the emergency indication signal 12. In further examples, the EV-related data 11 can be transmitted only upon the transmission of the emergency indication signal 12, or can be transmitted regardless thereof.

In addition, the sensor devices 160 collects the EV-related data 11. For example, the sensor data such as the location, the moving direction, and the velocity can be collected using sensor devices 160 including, but are not limited to: an accelerometer, a global positioning system (GPS) receiver, a velocity sensor, a motion sensor, infrared light sensors, radar, laser radar, cameras, a gyroscope, or the like. The collected EV-related data 11 may be stored in the memory 120 or other storage (not shown).

In addition, the memory 120 includes program instructions executable by the processor 110 to perform functions or operations of the emergency subscriber device 100 described in the present disclosure. The processor 110 reads the stored data which have been collected from the sensor devices 160 and processes to generate messages that will be transmitted to the remote management server 20 through the transmitter 132 of the communication device 130. In one embodiment, the receiver 134 of the communication device 130 can be used to receive a control or confirmation signal from the remote management server 20.

The communication network 15 may be implemented using on a wireless communication technique based on radio-frequency identification (RFID), code division multiple access (CDMA), global system for mobile communication (GSM), wideband CDMA. CDMA-2000, time division multiple access (TDMA), long term evolution (LTE), wireless LAN, Bluetooth. or the like. The communication device 130 may be implemented to support at least one of the above-mentioned communication techniques.

The input device 140 can be, but is not limited to: a keyboard, a touch screen, an audio input system, a voice recognition system, or the like. The output device 150 can be, but is not limited to: a screen, a speaker, a light, a siren, a visual system, an audio system, or the like.

Referring further to FIG. 2B, the remote management server 20 includes a processor 210, a memory 220, a communication device 230, and an input device 240. The remote management server 20 may reside on a network infrastructure or on a third-party service provider, such as a cloud storage and computing system. The remote management server 20 receives the EV-related data 11 using a receiver 234 of the communication device 230 transmitted over the communication network 15 and store the data 11 into the memory 220.

The communication device 230 includes a transmitter 232 and the receiver 234. The communication device 230 may be implemented to support at least one of the above-mentioned communication techniques such as RFID, CDMA, GSM, wideband CDMA, CDMA-2000, TDMA, LTE, wireless LAN. Bluetooth, or the like. The input device 240 can be, but is not limited to: a keyboard, a touch screen, an audio input system, a voice recognition system, or the like.

Figure 3C:
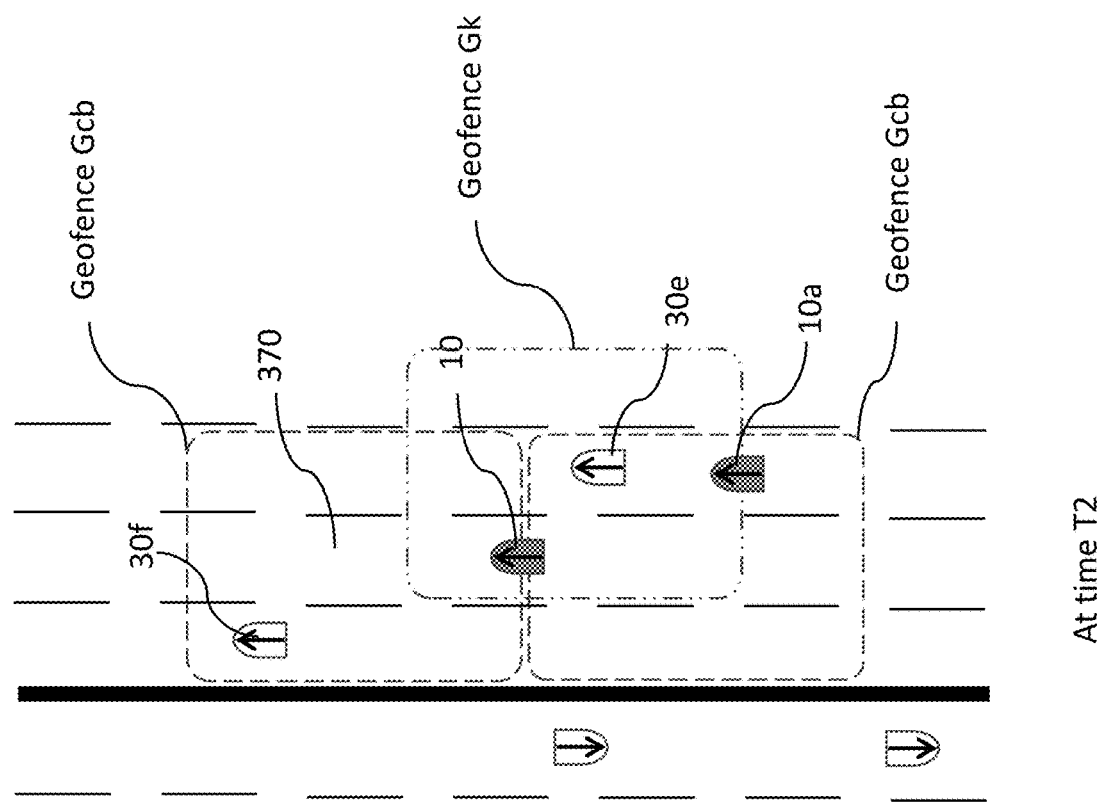
FIG. 3C depicts an example scenario where a geofence is setup for additional EV, according to an exemplary embodiment of the present disclosure.

FIGS. 3A-3B depict an example scenario where geofences are setup and cleared up for an EV, according to an exemplary embodiment of the present disclosure. FIG. 3C depicts an example scenario where a geofence is setup for additional EV, according to an exemplary embodiment of the present disclosure.

Referring to FIG. 3A, the EV 10 travels on a road 370 while other vehicles 30e and 30f travel near the EV 10. Referring further to FIG. 2B, upon receiving the emergency indication signal 12 from the EV 10, the processor 210 of the management server 20 determines, at a first time T1, a geofence Ga for the EV 10 based on the EV-related data 11 (e.g., based on a location, velocity, type and/or moving direction of the EV 10) and generates the safety warning signal based on the geofence Ga. The remote management server 20 transmits the generated safety warning signal to other vehicles 30e and 30f using the transmitter 232. Each of the vehicles 30e and 30f (e.g., the subscriber device 300 included each vehicle 30e and 30f) receives the safety warning signal including the geofence Ga, performs one or more alert actions in response to determining that a location of each vehicle 30e and 30f is within the geofence Ga, and performs no alert action in response to determining that the location of each vehicle 30e and 30f is out of the geofence Ga. The alert actions may include generating a visual and/or audible warning signal for a driver to recognize an EV alert for next safety actions such as yielding for the EV to let the EV safely pass.

For example, since in the example shown in FIG. 3A, the vehicle 30e traveling ahead the EV 10 is located within the geofence Ga at a time T1, the subscriber device (e.g., 300 of FIG. 2C) of the vehicle 30e performs the alert actions. Further, since the vehicle 30f is not located within the geofence Ga at the time T1, the subscriber device (e.g., 300 of FIG. 2C) of the vehicle 30f performs no alert action.

Referring now to FIG. 3B, at a time T2 subsequent to the time T1, the EV 10 passes the vehicle 30e and get closer to the vehicle 30f, so that the vehicle 30e is located behind the EV 10 and the vehicle 30f is within a new geofence Gb. It should be appreciated that the management server 20 repeats the steps of collecting the EV-related data 11 from the first device 100, determining a geofence based on the EV-related data 11, and transmitting a safety warning signal(s) including the determined geofence(s). For example, the management server 20 transmits (e.g., broadcasts) the geofence Ga and a geofence Gca at the time T1 (see FIG. 3A) and transmits (e.g., broadcasts) the geofence Gb and a geofence Gcb at the time T2 (see FIG. 3B).

Here, as shown in FIG. 3A, the geofence Ga represents a geofence setup zone where vehicles (e.g., 30e) are alerted to the presence of the EV 10, and the geofence Gca represents a geofence release zone where a geofence (not shown) that has been setup before the time T1 is canceled or removed. Similarly, as shown in FIG. 3B, the geofence Gb represents a geofence setup zone where vehicles (e.g., 30f) are alerted to the presence of the EV 10, and the geofence Gcb represents a geofence release zone where the geofence Ga that has been setup for the vehicle 30*e* (see FIG. 3A) is cleared or removed, so that vehicles (e.g., 30*e*) that has been alerted to the presence of the EV according to the geofence Ga and is located within the geofence Gcb would not be alerted to the presence of the EV any more. To ease the description of the present disclosure, the geofences Ga and Gb can be referred to as "setup geofences", and the geofences Gca and Gcb can be referred to as "release geofences".

In one embodiment, referring to FIG. 4A, illustrated is an example safety warning signal 500*a* generated by the processor 210 of the remote management server 20 and transmitted to the subscriber device (e.g., 300) of each vehicle 30*e* and 30*f*. The safety warning signal 500*a* includes, but is not limited to: an EV ID 510 and geofence information 520 related to the EV ID 510. The geofence information 520 can be any information used for identifying directly or indirectly features (e.g., size or shape) of the geofence for the EV 10.

Referring to FIG. 4B, illustrated is another example safety warning signal 500*b* that further includes an EV type 510 and one or more alert actions 540 for each vehicle 30*e* and 30*f* to follow when a certain condition is met. The certain condition may include that a current location of each vehicle 30*e* and 30*f* is matched to a geofence defined by the geofence information.

Referring back to FIGS. 3A and 3B, in one embodiment, the setup geofence Ga and the release geofence Gca (or the setup geofence Gb and the release geofence Gcb) can be transmitted over separate safety warning signals; in another embodiment, the geofences Ga and Gca (or the geofences Gb and Gcb) can be transmitted over a single safety warning signal (e.g., 500*a* or 500*b*) whose geofence information field 520 includes information of both the geofences Ga and Gca (or the geofences Gb and Gcb). Exemplary embodiments of the present disclosure are not limited thereto.

Referring back to FIGS. 4A and 4B, in one embodiment, the geofence information 520 is directly provided as a set of location coordinates corresponding to a boundary of the determined geofence.

In another embodiment, the geofence information 520 is indirectly provided as an indication (e.g., geofence function G(x)) that can be used by the subscriber device 300 to retrieve the geofence from the geofence information 520. When the geofence information 520 is indirectly provided as an indication that can be used by the subscriber device 300, a current location of the EV 10 may be provided in the safety warning signal 500*a* and/or safety warning signal 500*b*, so that the subscriber device 300 can combine the EV current location to generate a more exact geofence defined around the EV 10, and/or the subscriber device 300 tracks of the EV 10's movement based on the EV current location and displays on a visual system thereof. By way of example, the indication can be an index identifying a specific geofence, and information regarding relationships between the indices and their respective mapping geofences can be prestored in the memory 320 of the subscriber device 300, so that the subscriber device 300 can read out an appropriate geofence based on the index.

In one embodiment, the processor 210 of the remote management server 20 may further generate a confirmation signal (not shown) to transmit it back to the EV 10 when, before, and/or after the safety warning signal 500*a* or 500*b* is transmitted to the vehicles (e.g., 30*e* and 30*f*), so that the EV 10 may recognize that the emergency state thereof has been transferred to the remote management server 20 and the safety action for the EV has started. In some examples, the safety warning signal 500*a* or 500*b* is transmitted to the subscriber device 300 of each vehicle (e.g., 30*e* and 30*f*), and the processor 310 of the subscriber device 300 processes the geofence information 520 in the safety warning signal 500*a* or 500*b* to display the geofence through a display of the alert-generation device 370 of the subscriber device 300.

Referring further to FIG. 2C, the subscriber device 300 includes a processor 310, a memory 320, a communication device 330, an input device 340, and an alert-generation device 370. Each vehicle (e.g., 30*e* and 30*f*) may be a vehicle registered for services that provide emergency vehicle alerts, so that at least one of the above components thereof is designed to have features to receive the emergency vehicle alerts.

For example, the communication device 330 includes a transmitter 332 and a receiver 334 which are implemented to support at least one of the above-mentioned communication techniques being capable of communicating with the communication device 230 of the remote management server 20 and/or the communication device 130 of the EV 10.

The safety warning signal 500*a* or 500*b* received through the receiver 334 may be stored in the memory 320. The processor 310 may retrieve an ID and/or a geofence for the EV 10 based on the safety warning signal 500*a* or 500*b*.

In one embodiment, if the geofence information 520 is provided as a set of location coordinates corresponding to a boundary of the determined geofence, the processor 310 of the subscriber device 300 determines whether a current location of the corresponding vehicle is matched to the geofence of the EV 10 based on the set of location coordinates in the geofence information 520. For example, if the current location of each vehicle (e.g., 30*e* and 30*f*) is within the boundary defined by the set of location coordinates, the processor 310 determines a match between the vehicle current location and the geofence; otherwise, it determines a mismatch therebetween. If the match is found between the current location and the geofence, the processor 310 controls the alert-generation device 370 to perform one or more alert actions; otherwise (e.g., if no match is found therebetween), the processor 310 discards the safety warning signal 500*a* or 500*b* and performs no further action for providing the EV alert.

In one embodiment, if the geofence information 520 is provided as an indication for geofence (e.g., geofence function G(x)) as discussed above, the processor 310 further retrieves the geofence based on the geofence information 520 (e.g., based on the geofence function G(x)), and then determines whether the vehicle current location is located within the geofence or not. If a match is found between the current location and the geofence, the processor 310 controls the alert-generation device 370 to perform one or more alert actions; otherwise (e.g., if no match is found therebetween) the processor 310 discards the safety warning signal 500*a* or 500*b* and performs no further action for providing the EV alert.

In one embodiment, the alert-generation device 370 is configured to perform alert actions under control of the processor 310. The alert-generation device 370 can be, but is not limited to: a screen, a speaker, a light, a siren, a visual system, an audio system, or the like. The input device 340 can be, but is not limited to: a keyboard, a touch screen, an audio input system, a voice recognition system, or the like. The current location can be collected using the sensor devices 360 such as a positioning device, as shown in FIG. 2C.

In one embodiment, the alert actions include generating a visual and/or audible warning signal for a driver to recognize an EV alert for next safety actions such as yielding for the EV to let the EV safely pass.

In one embodiment, the alert actions are preprogrammed and stored in the memory 320 of the subscriber device 300, and when a match is found between the current location and the geofence, the processor 310 reads the alert actions from the memory 320 to control the alert-generation device 370 to perform the alert actions.

In one embodiment, the alert actions are transferred from the remote management server 20 to the subscriber device 300 of each vehicle 30a to 30d through the alert action information field 520 in the safety warning signal 500b, as depicted in FIG. 4B. In this case, the processor 310 controls the alert-generation device 370 to perform the alert actions, as instructed in the alert action information field 540.

The geofences can dynamically be adjusted in size or shape according to a velocity and/or type of the EV 10, example embodiments of which are described in Applicant's copending patent application U.S. patent application Ser. No. 16/243,692 filed on Jan. 9, 2019, entitled "SYSTEM AND METHOD FOR VELOCITY-BASED GEOFENCING FOR EMERGENCY VEHICLE", the entire disclosure of which is incorporated by reference herein. The geofences can dynamically be adjusted in size or shape according to geographical map information near the EV 10, example embodiments of which are described in Applicant's copending patent application U.S. patent application Ser. No. 16/294,470 filed on Mar. 6, 2019, entitled "SYSTEM AND METHOD FOR MAP-BASED GEOFENCING FOR EMERGENCY VEHICLE", the entire disclosure of which is incorporated by reference herein.

FIG. 5 depicts an example mapping table where mapping relationships among a type of geofences, a geofence and a corresponding geofence function are defined according to an exemplary embodiment of the present disclosure. The mapping table 222 may be stored in the memory 220 of the remote management server 20. In one embodiment, the processor 210 may look up the mapping table 222 to determine a corresponding geofence.

In an example shown in FIG. 5, when the management server 20 determines the setup geofence Ga (or Gb) to transmit it, a geofence function $G_a(x)$ (or $G_b(x)$) corresponding to the geofence Ga (or Gb) can be provided as the geofence information 520. Similarly, when the management server 20 determines the release geofence Gca (or Gcb) to transmit it, a geofence function $G_{ca}(x)$ (or $G_{cb}(x)$) can be provided as the geofence information 520.

Once a specific geofence for an EV 10 is determined, the determined geofence can be combined with a current location of the EV 10 provided with the EV-related data 11 to generate the geofence information 520 of the safety warning signal 500a or 500b. The geofence information 520 may include a geofence function $G(x)$ defined with respect to the current location of the EV 10.

Although it is illustrated in figures that geofences are provided in a two-dimensional fashion, exemplary embodiments of the present disclosure are not limited thereto. For example, a geofence for an EV can be provided in a three-dimensional fashion.

Figure 6:
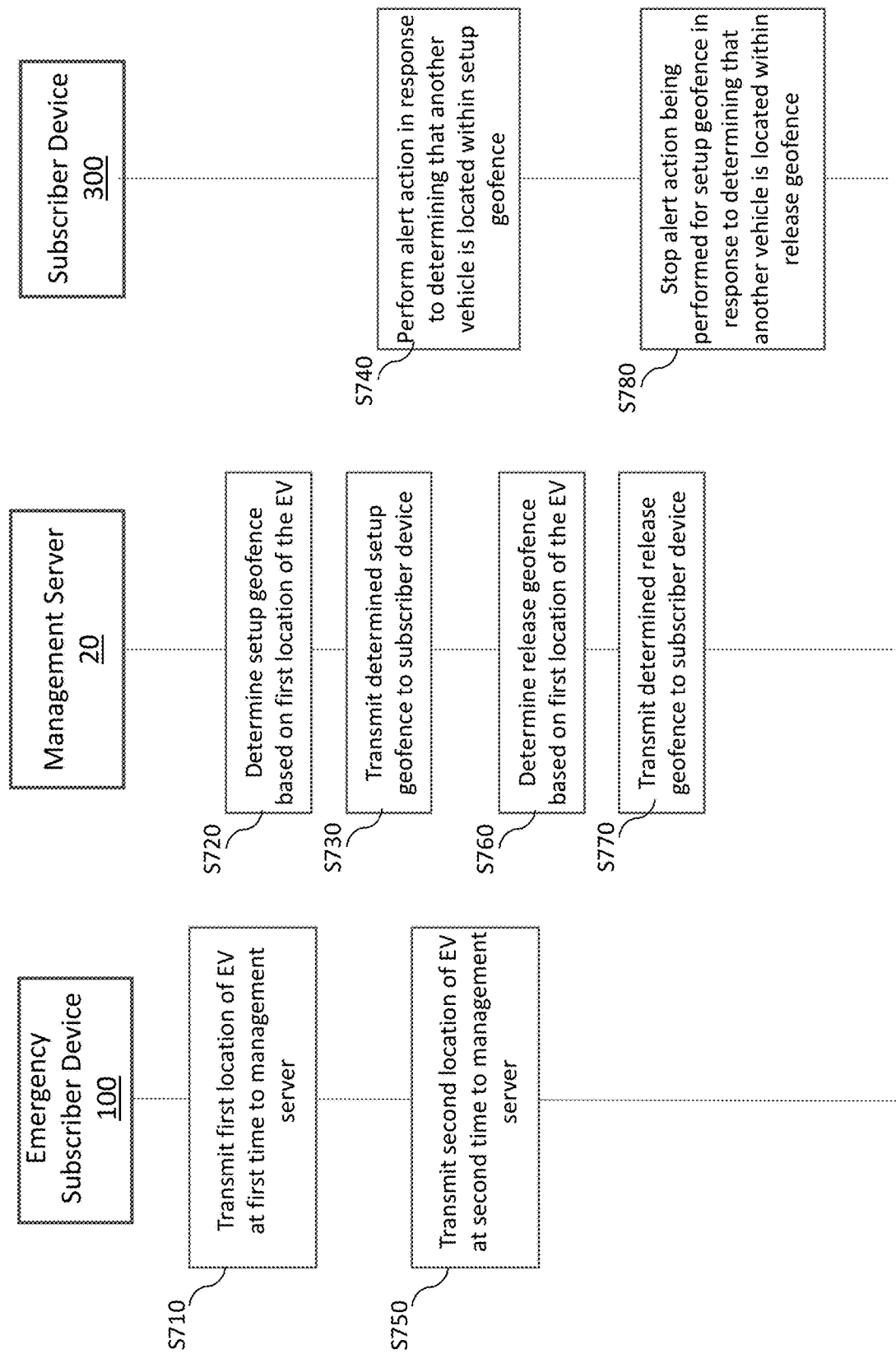
FIG. 6 is a flow chart illustrating a method for clearing an EV alert geofence, according to an exemplary embodiment of the present disclosure.

FIG. 6 is a flow chart illustrating a method for clearing an EV alert geofence according to an exemplary embodiment of the present disclosure.

Referring now to FIGS. 1, 2A-2C, 3A. 3B and 6, at a time T1, the EV 10 (or emergency subscriber device 100 installed in the EV 10 or attached thereto) collects EV-related data 11 such as a location, a type, a velocity or the like using the sensor devices 160 (not shown) and transmits the EV-related data 11 to the remote management server 20 (S710). In addition, the remote management server 20 receives the EV-related data 11 (not shown) and determines a setup geofence (e.g., Ga of FIG. 3A) based on a first location of the EV-related data 11 (S720) and generates a safety warning signal 500a or 500b including geofence information 520 associated with the setup geofence (not shown).

In step S730, the remote management server 20 transmits the safety warning signal 500a or 500b including the setup geofence (e.g., Ga) to other vehicles 30a to 30d (or subscriber device 300 installed in the vehicle or attached thereto). In one embodiment, the management server 20 may further determine another release geofence (e.g., Gca of FIG. 3A) based on the first location of the EV 10 and transmits the release geofence over the safety warning signal 500a or 500b.

The subscriber device 300 of each vehicle (e.g., 30c and 30f) receives and analyzes the safety warning signal 500a or 500b to retrieve the setup geofence (not shown). The subscriber device 300 (e.g., processor 310) determines whether a current location of the corresponding vehicle is matched to the setup geofence (e.g., whether the vehicle current location is located within the geofence). If a match is found between the current location and the setup geofence, the processor 310 controls the alert-generation device 370 to perform one or more alert actions (S740); otherwise, (e.g., if no match is found therebetween) the processor 310 may discard the safety warning signal 500a or 500b and perform no alert action (not shown). In step S750, at a time T2 after T1, the EV 10 (or the emergency subscriber device 100) transmits EV-related data 11 including a second location of the EV 10. Next, the management server 20 determines a release geofence (e.g., Gcb of FIG. 3B) based on the second location of the EV-related data 11 (S760) and generates a safety warning signal 500a or 500b including geofence information 520 associated with the release geofence (not shown). In step S770, the remote management server 20 transmits the safety warning signal 500a or 500b including the release geofence (e.g., Gcb) to other vehicles 30a to 30d (or subscriber device 300). In one embodiment, at the time T2, the management server 20 may further determine another setup geofence (e.g., Gb of FIG. 3B) based on the second location of the EV 10 and transmits the setup geofence over the safety warning signal 500a or 500b. The subscriber 300 of the vehicle (e.g., 30e) analyzes the safety warning signal 500a or 500b to retrieve the release geofence (not shown) and determines whether a current location of the corresponding vehicle is matched to the release geofence (e.g., whether the vehicle current location is located within the release geofence). If a match is found, the processor 310 controls the alert-generation device 370 to stop the alert actions that have been performed according to the setup geofence (e.g., Ga) (S740); otherwise, (e.g., if no match is found therebetween) the processor 310 may discard the safety warning signal 500a or 500b including the release geofence (e.g., Gcb) and/or continue to perform the alert action associated with the setup geofence (e.g., Ga). It will also be appreciated that the steps S710 to S780 may be repeated in a periodic time manner.

In some example scenarios where one or more another EVs (e.g., 10a) travel near the EV 10, as exemplarily shown in FIG. 3C, the management server 20 may determine a setup geofence Gk and a release geofence (not shown) for the EV 10a and transmit them through a respective safety warning signal (e.g., 500a or 500b) with a respective ID (e.g., 510). What is depicted in FIG. 3C is substantially the same as FIG. 3B except for the additional EV 10a and the setup geofence Gk associated with the EV 10a. In other words, at the time T2, the subscriber device 300 of the vehicle 30e can receive information of a plurality of geofences including, for example, a setup geofence Gb for the EV 10, a release geofence Gcb for the EV 10, a setup geofence Gk for the EV 10a and a release geofence (not shown) for the EV 10a through one or more safety warning signals and determines to which EV each geofence belongs, based on the EV ID (e.g., 510).

As discussed above, regarding the EV 10, the vehicle 30e is located out of the setup geofence Gb and within the geofence Gcb, and thus the vehicle 30e may discard the setup geofence Gb for the EV 10 and stop alert actions being performed according to the geofence Gb. At substantially the same time, regarding the EV 10a, the vehicle 30e is located within the setup geofence Gk, and thus the vehicle 30e may perform alert actions according to the setup geofence Gk for the EV 10a.

Figure 3D:
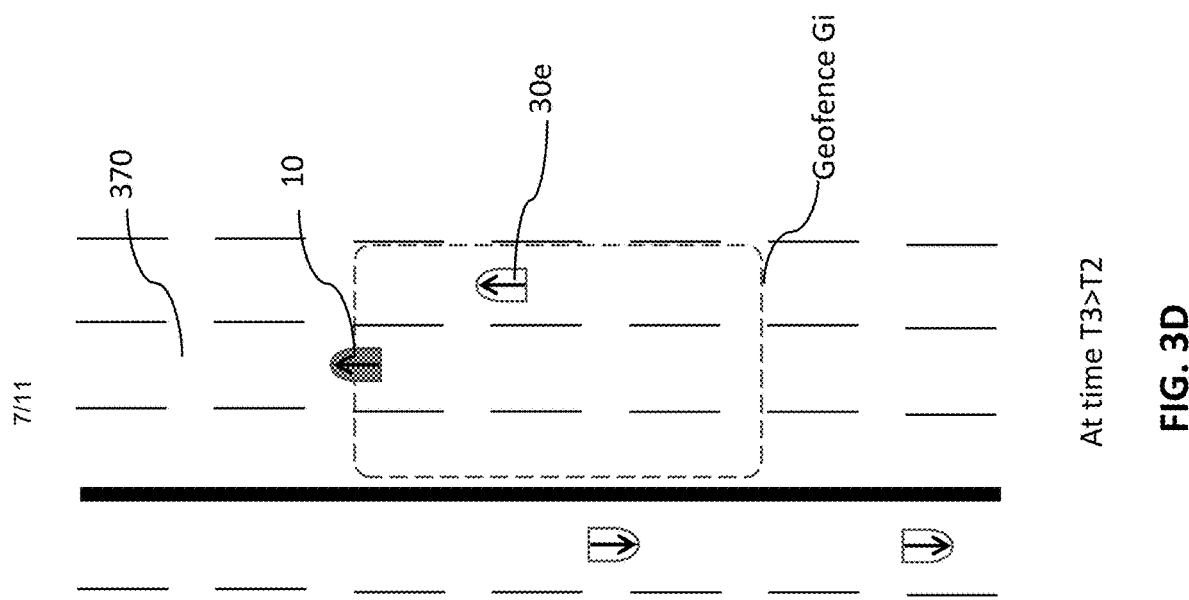
FIG. 3D depicts an example scenario where a geofence is setup when an EV suddenly slows down or stops, according to an exemplary embodiment of the present disclosure.

In some scenarios, the EV 10 may suddenly slow down or stop after it passes the vehicle 30e, as exemplary depicted in FIG. 3D. Referring back to FIG. 3B, the vehicle 30e receives the release geofence Gcb and stops alert actions being performed according to a previously received setup geofence (e.g., Ga).

Further, in response to determining that the EV 10 slows down or stops, the management server 20 can generate another geofence Gi and transmits the same to vehicles (e.g., 30e) traveling behind the EV 10 and approaching the EV 10 to prevent them from crashing into the EV 10. The EV-related data 11 transmitted from the EV 10 can be used for the management server 20 to determine whether the EV 10 slows down or stops. For example, if the velocity of the EV 10 drops by more than a predetermined value (e.g., 30 miles/hour) within a predetermined duration (e.g., 5 seconds) or drops below a predetermined value (e.g., 30 miles/hour), the management server 20 determines that the EV 10 slows down. In addition, if the velocity of the EV 10 drops to approxiately zero, the management server 20 determines that the EV 10 stops.

The geofence Gi is defined to cover one or more rear regions of the EV 10 where the vehicles (e.g., 30e) traveling behind the EV 10 and approaching the EV 10 are located. For example, the vehicle 30e receives the geofence Gi and performs alert actions in response to determining that the vehicle 30e is located within the geofence Gi.

Figure 7:
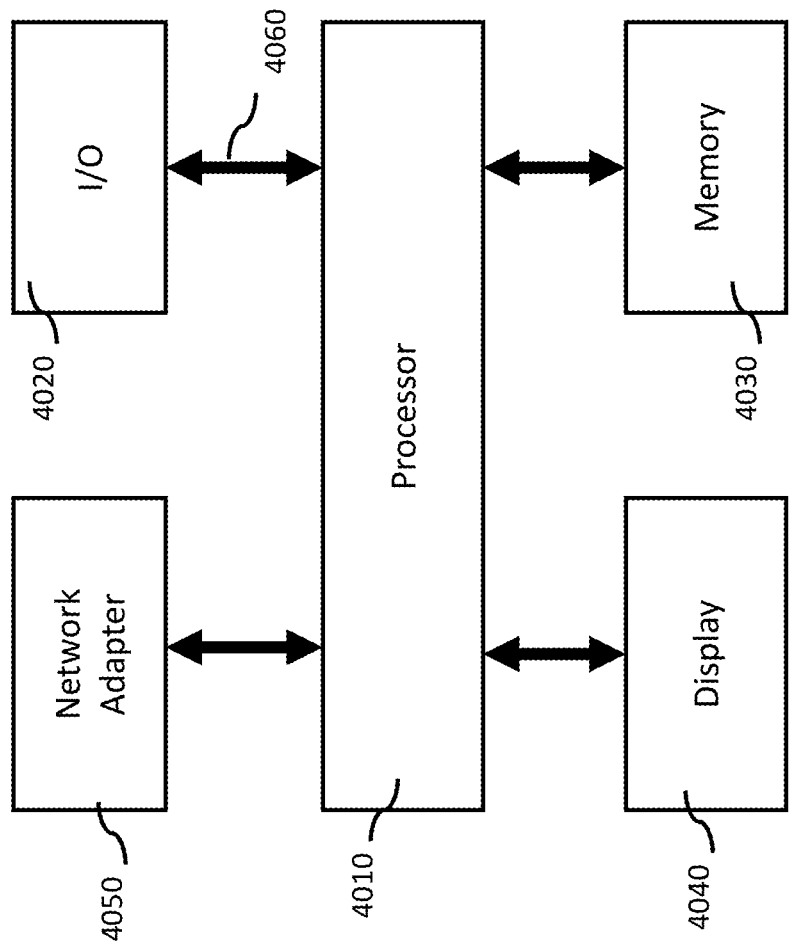
FIG. 7 is a block diagram of a computing system according to an exemplary embodiment of the present disclosure.

FIG. 7 is a block diagram of a computing system 4000 according to an exemplary embodiment of the present disclosure.

Referring to FIG. 7, the computing system 4000 may be used as a platform for performing: the functions or operations described hereinabove with respect to at least one of the emergency subscriber device 100, the remote management server 20 and the subscriber device 300; and the methods described with reference to FIG. 6.

Referring to FIG. 7, the computing system 4000 may include a processor 4010. I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions or operations described hereinabove with respect to at least one of the emergency subscriber device 100, the remote management server 20 and the subscriber device 300; and the methods described with reference to FIG. 6. For example, the program module may include routines, programs, objects, components, logic, data structures, or the like, for performing particular tasks or implement particular abstract data types. The processor (e.g., 4010) of the computing system 4000 may execute instructions written in the program module to perform: the functions or operations described hereinabove with respect to at least one of the emergency subscriber device 100, the remote management server 20 and the subscriber device 300; and the methods described with reference to FIG. 6. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, Zig Bee, or the like.

Exemplary embodiments of the present disclosure may include a system, a method, and/or a non-transitory computer readable storage medium. The non-transitory computer readable storage medium (e.g., the memory system 4030) has computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A system for managing a geofence for an emergency vehicle (EV), comprising:
 a receiver configured to receive a first location of the EV from a first device at a first time, the first device being associated with the EV;
 a processor configured to determine a first geofence based on the first location of the EV; and a transmitter configured to transmit the determined first geofence to a second device associated with another vehicle, the another vehicle being located within the first geofence, wherein the receiver is further configured to receive a second location of the EV from the first device at a second time subsequent to the first time, wherein the processor is further configured to determine a geofence release zone based on the second location of the EV, and wherein the transmitter is further configured to transmit the geofence release zone to the second device, and wherein the geofence release zone is further defined to cover one or more rear regions located behind the second location of the EV.

2. The system of claim 1, wherein the second device is configured to:
receive the first geofence;
determine a location of the other vehicle with respect to the received first geofence; and
perform one or more alert actions based on the determined location of the other vehicle with respect to the first geofence.

3. The system of claim 2, wherein the second device is further configured to:
receive the geofence release zone;
determine the location of the other vehicle with respect to the received geofence release zone; and
stop performing the one or more alert actions based on the determined location of the other vehicle with respect to the geofence release zone.

4. The system of claim 1, further comprising the second device, wherein the second device comprises:
another receiver configured to receive the first geofence and the geofence release zone; and
another processor configured to control an alert-generation device to:
determine a location of the other vehicle with respect to the received first geofence;
perform the one or more alert actions based on the determined location of the other vehicle with respect to the first geofence;
determine the location of the other vehicle with respect to the received geofence release zone; and
stop performing the one or more alert actions based on the determined location of the other vehicle with respect to the geofence release zone.

5. The system of claim 1, wherein the geofence release zone is defined to cover one or more rear regions located behind the second location of the EV.

6. The system of claim 1, wherein the processor is further configured to generate a first control signal including the first geofence and a second control signal including the geofence release zone, and
wherein the transmitter is further configured to broadcast the first and second control signals over a wireless channel around the EV.

7. The system of claim 1, wherein a region defined by the first geofence does not overlap the geofence release zone.

8. The system of claim 4, wherein the alert-generation device comprises at least one of a speaker and a visual display.

9. The system of claim 1, wherein the processor is further configured to determine a second geofence defined to cover one or more rear regions of the EV when the EV slows down or stops, wherein the transmitter is further configured to transmit the determined second geofence to the second device, and wherein the second device is configured to:
receive the second geofence;
determine a location of the other vehicle with respect to the received second geofence; and
perform second one or more alert actions based on the determined location of the other vehicle with respect to the received second geofence.

10. A system for managing a geofence for an emergency vehicle (EV), comprising:
a receiver configured to receive a first location of the EV from a first device at a first time, the first device being associated with the EV;
a processor configured to determine a first geofence based on the first location of the EV; and
a transmitter configured to transmit the determined first geofence to a second device associated with another vehicle, the another vehicle being located within the first geofence, wherein the receiver is further configured to receive a second location of the EV from the first device at a second time subsequent to the first time, wherein the processor is further configured to determine a geofence release zone based on the second location of the EV, and wherein the transmitter is further configured to transmit the geofence release zone to the second device, and wherein the first geofence is further defined to cover one or more regions excluding all rear regions of the EV.

11. The system of claim 10, wherein the second device is configured to:
receive the first geofence;
determine a location of the other vehicle with respect to the received first geofence; and
perform one or more alert actions based on the determined location of the other vehicle with respect to the first geofence.

12. The system of claim 10, wherein the second device is further configured to:
receive the geofence release zone;
determine the location of the other vehicle with respect to the received geofence release zone; and
stop performing the one or more alert actions based on the determined location of the other vehicle with respect to the geofence release zone.

13. The system of claim 10, further comprising the second device, wherein the second device comprises:
another receiver configured to receive the first geofence and the geofence release zone; and
another processor configured to control an alert-generation device to:
determine a location of the other vehicle with respect to the received first geofence;
perform the one or more alert actions based on the determined location of the other vehicle with respect to the first geofence;
determine the location of the other vehicle with respect to the received geofence release zone; and
stop performing the one or more alert actions based on the determined location of the other vehicle with respect to the geofence release zone.

14. The system of claim 10, wherein the first geofence is defined to cover one or more regions excluding all rear regions of the EV.

15. The system of claim 10, wherein the processor is further configured to generate a first control signal including the first geofence and a second control signal including the geofence release zone, and
   wherein the transmitter is further configured to broadcast the first and second control signals over a wireless channel around the EV.

16. The system of claim 10, wherein a region defined by the first geofence does not overlap the geofence release zone.

17. The system of claim 16, wherein the alert-generation device comprises at least one of a speaker and a visual display.

18. The system of claim 10, wherein the processor is further configured to determine a second geofence defined to cover one or more rear regions of the EV when the EV slows down or stops,
   wherein the transmitter is further configured to transmit the determined second geofence to the second device, and
   wherein the second device is configured to:
      receive the second geofence;
      determine a location of the other vehicle with respect to the received second geofence; and
      perform second one or more alert actions based on the determined location of the other vehicle with respect to the received second geofence.

* * * * *